(12) United States Patent
Mueller et al.

(10) Patent No.: US 10,164,852 B2
(45) Date of Patent: Dec. 25, 2018

(54) INFRASTRUCTURE MANAGEMENT SYSTEM FOR HARDWARE FAILURE REMEDIATION

(71) Applicant: MICROSOFT TECHNOLOGY LICENSING, LLC, Redmond, WA (US)

(72) Inventors: Ulrich Mueller, Redmond, WA (US); Jiwu Liu, Redmond, WA (US); Marwan E. Jubran, Redmond, WA (US); Aleksandr Mikhailovich Gershaft, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 181 days.

(21) Appl. No.: 15/167,394

(22) Filed: May 27, 2016

(65) Prior Publication Data

US 2017/0195201 A1 Jul. 6, 2017

Related U.S. Application Data

(60) Provisional application No. 62/274,105, filed on Dec. 31, 2015.

(51) Int. Cl.
*H04L 12/26* (2006.01)
*H04L 12/24* (2006.01)
(Continued)

(52) U.S. Cl.
CPC ......... *H04L 43/0817* (2013.01); *G06Q 10/00* (2013.01); *G06Q 10/0837* (2013.01);
(Continued)

(58) Field of Classification Search
CPC ... H04L 67/125; H04L 43/10; H04L 41/0659; H04L 41/501; H04L 41/5025; G06Q 10/20
See application file for complete search history.

(56) References Cited

U.S. PATENT DOCUMENTS 9,262,451 B1 * 2/2016 Singh ................ G06F 17/30303
9,602,426 B2 * 3/2017 Das .......................... H04L 47/72
(Continued)

FOREIGN PATENT DOCUMENTS

EP 0980189 A2 2/2000

OTHER PUBLICATIONS

"International Search Report and Written Opinion Issued in PCT Application No. PCT/US2016/068608", dated Mar. 17, 2017, 10 Pages.
(Continued)

*Primary Examiner* — Chirag R Patel
(74) *Attorney, Agent, or Firm* — Shook, Hardy & Bacon, L.L.P.

(57) ABSTRACT

In embodiments, methods and systems for implementing an infrastructure management system that supports hardware failure remediation are provided. A determination is made that a failure of a hardware component has occurred. The hardware component is part of a hardware composite. A remediation attribute of the hardware composite is accessed. The remediation attribute indicates a minimum operational bar for the hardware composite. The minimum operational bar is based on health metrics or optional and required components of the hardware composite. The bar supports determining whether the hardware composite should operate in a degraded state. A determination is made that the hardware composite if operating without the hardware component that has failed meets the minimum operational bar
(Continued)

for the hardware composite. Operation of the hardware composite in the degraded state is initiated. In embodiments, hardware managers are associated with degraded state configurations to facilitate operating the hardware composite in the degraded state.

20 Claims, 8 Drawing Sheets

(51) Int. Cl.
*G06Q 10/08* (2012.01)
*G06Q 10/00* (2012.01)
*H04L 29/08* (2006.01)

(52) U.S. Cl.
CPC ......... *G06Q 10/20* (2013.01); *H04L 41/0659* (2013.01); *H04L 41/5012* (2013.01); *H04L 41/5025* (2013.01); *H04L 43/16* (2013.01); *H04L 67/10* (2013.01)

(56) References Cited

U.S. PATENT DOCUMENTS

| | | | |
|---|---|---|---|
| 2004/0117229 A1* | 6/2004 | Chung | G06Q 10/06 705/303 |
| 2008/0184044 A1* | 7/2008 | Leech | G06F 1/28 713/300 |
| 2014/0075239 A1 | 3/2014 | Prathipati et al. | |
| 2014/0298076 A1 | 10/2014 | Kanayama et al. | |
| 2017/0082680 A1* | 3/2017 | Eck | G01R 31/2815 |
| 2017/0104640 A1* | 4/2017 | Jain | H04L 41/5022 |

OTHER PUBLICATIONS

"Second Written Opinion Issued in PCT Application No. PCT/US2016/068608", dated Nov. 6, 2017, 7 Pages.

"International Preliminary Report on Patentability Issued in PCT Application No. PCT/US2016/068608", dated Feb. 9, 2018, 8 Pages.

* cited by examiner

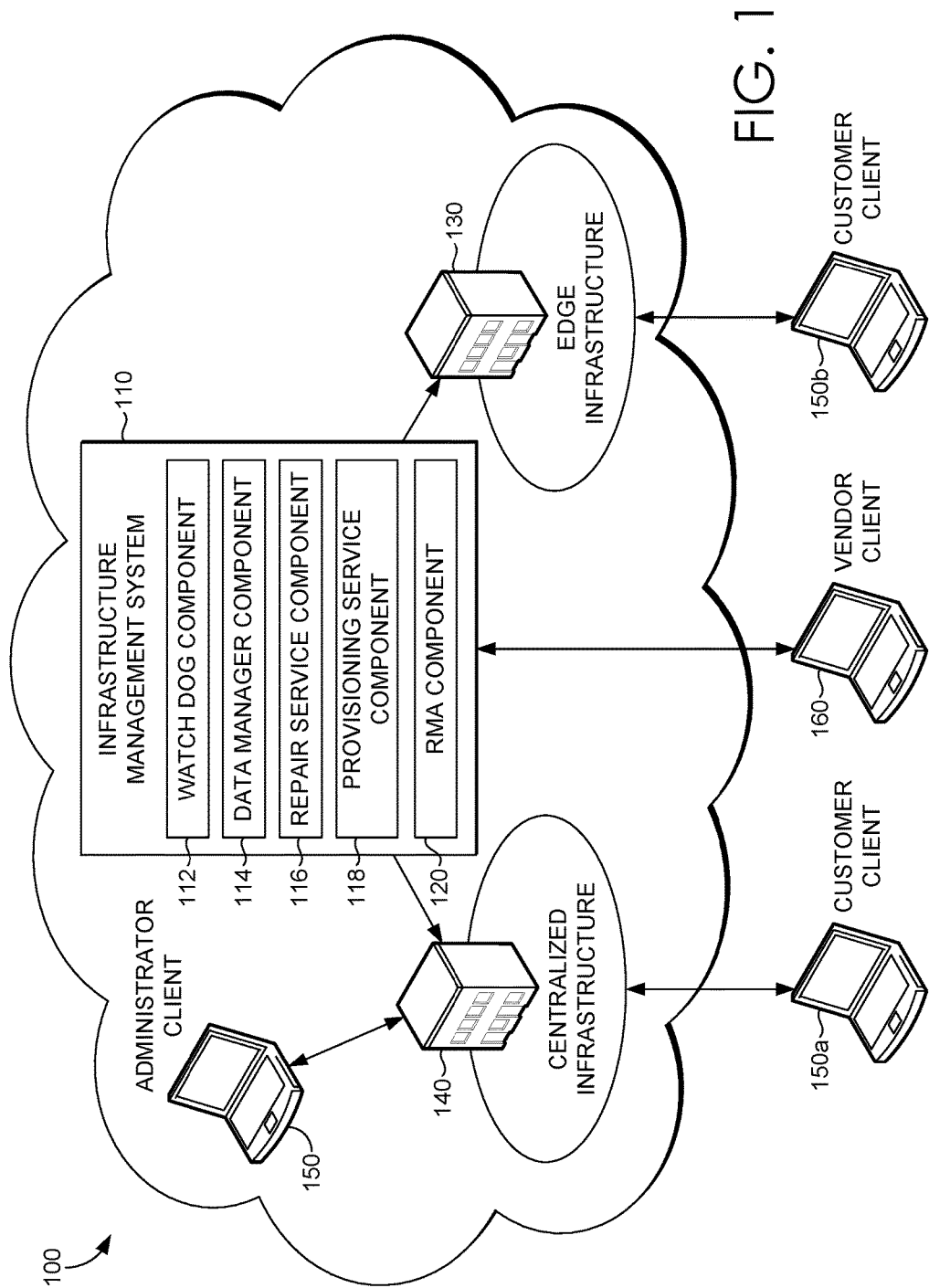

INFRASTRUCTURE MANAGEMENT SYSTEM FOR HARDWARE FAILURE REMEDIATION

This application claims priority to U.S. Provisional Application Ser. No. 62/274,105, filed Dec. 31, 2015, entitled "INFRASTRUCTURE MANAGEMENT SYSTEM FOR HARDWARE FAILURE REMEDIATION," which is incorporated herein by reference in its entirety.

BACKGROUND

Large-scale networked systems are commonplace platforms employed in a variety of settings for running applications and maintaining data for business and operational functions. For instance, a data center (e.g., physical cloud computing platform) may provide a variety of services (e.g., web applications, email services, search engine services, etc.) for a plurality of customers simultaneously. These large-scale networked systems typically include a large number of resources distributed throughout the data center in which each resource resembles a physical machine or a virtual machine (VM) running on a physical node or host. The data center runs on hardware components that may occasionally fail. In some situations, failed hardware component can be easily replaced. However, in other situations hardware components are not immediately replaceable. As such, a comprehensive system for configuring and implementing functioning data center hardware components along with failed data center hardware components, at least temporarily, can improve overall data center hardware operations and distributed hardware management to meet identified goals.

SUMMARY

Embodiments described herein provide methods and systems for implementing an infrastructure management system that supports hardware failure remediation. The infrastructure management system can be implemented based on infrastructure management system platform that include components that are operationally integrated to reduce the impact of failed hardware in hardware infrastructure of a distributed computing system. The infrastructure management system supports a configuration schema that helps define configuration files for hardware. The configuration schema can be a data structure for representing or defining configuration attributes for hardware in a computing infrastructure. The configuration schema specifically includes a health model for hardware. The health model is a technical representation of the computing condition of the hardware. The configuration schema and health model for hardware can be defined in a configuration file. The health model further defines a minimum operational bar for hardware based on health metrics or optional and required components associated with hardware. The minimum operational bar is used as a threshold for allowing hardware to run in a degraded state instead of failing the hardware completely. In this regard, the infrastructure management system improves the utilization rate of hardware, in that, hardware that would otherwise be designated as failed hardware is allowed to operate in the degraded state, prior to repair or replacing the hardware.

In operation, a determination is made that a failure of a hardware component has occurred. The hardware component is part of a hardware composite. A remediation attribute of the hardware composite is accessed. The remediation attribute indicates a minimum operational bar for the hardware composite. The minimum operational bar can be based on health metrics or on optional and required components of the hardware composite. The minimum operational bar supports determining whether the hardware composite should operate in a degraded state.

A determination is made that the hardware composite if operating without the hardware component that has failed still meets the minimum operational bar for the hardware composite. Operation of the hardware composite in a degraded state is initiated. The degraded state includes the hardware composite operating without the hardware component. In embodiments, hardware managers (e.g., an operating system and return merchandise authorization) are associated with degraded state configurations to facilitate initiating operation, running and repairing the hardware composite in a degraded state. The degraded state configurations can be defined in anticipation of the degraded state to support hardware composite operations and infrastructure management operations for the hardware composite running in the degraded state.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 1 is a block diagram of an exemplary distributed computing infrastructure environment in which embodiments described herein may be employed;

DETAILED DESCRIPTION

Figure 2A:
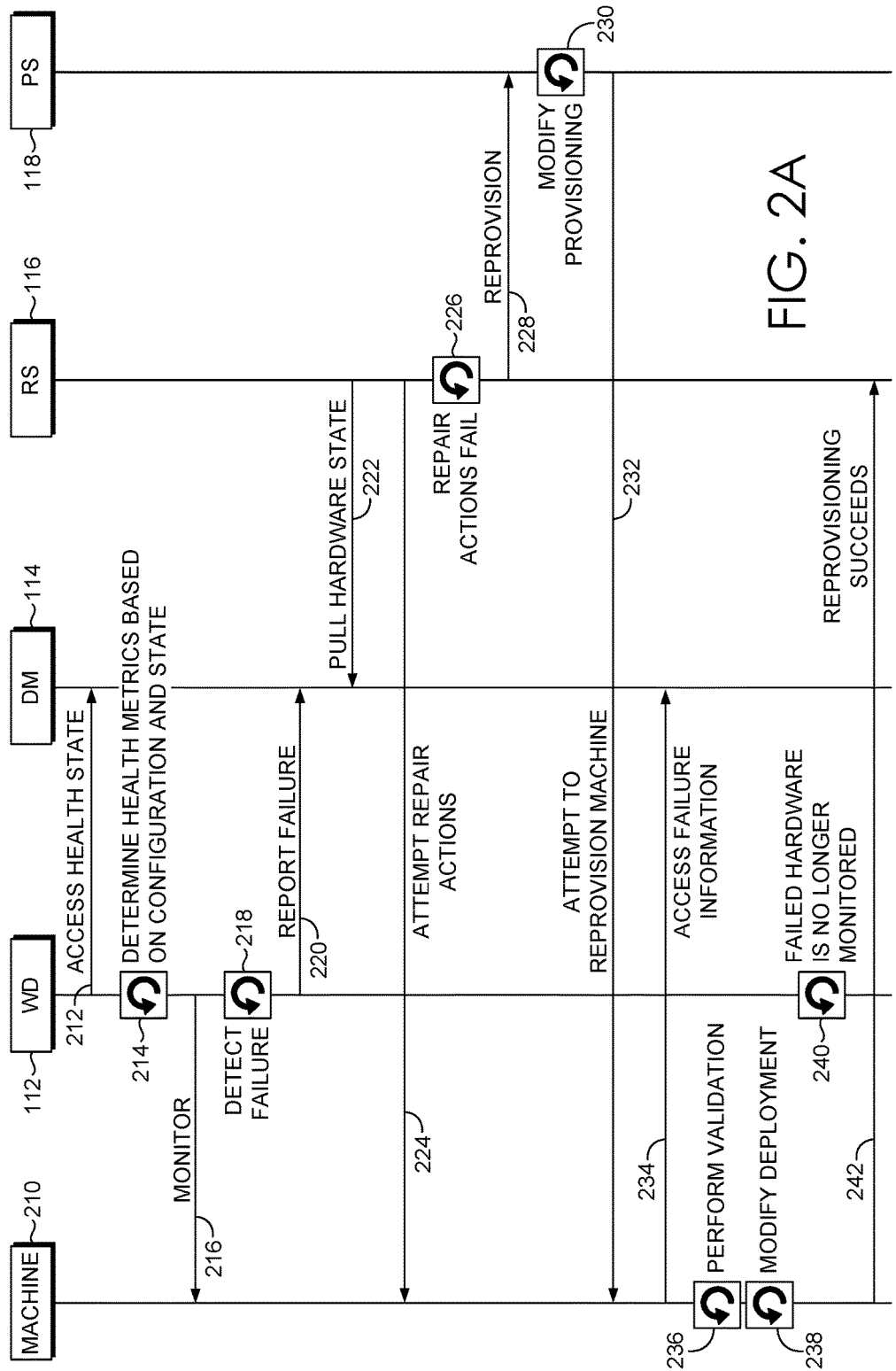
FIGS. 2A and 2B are block schematics of an exemplary implementation of an infrastructure management system for hardware failure remediation, in accordance with embodiments described herein.

Edge computing generally refers to pushing the frontier of computing applications, data and services away from centralized nodes to the logical extremes of the network. As such, a distributed computing system of a cloud-computing-network service provider can include an edge infrastructure that supports geographically dispersed customers of the distributed computing system. Edge infrastructure can be specifically deployed based on identified traffic and usage patterns in the distributed computing system. In this regard, a client device can access a distributed computing system from a central infrastructure of an edge infrastructure. Edge infrastructure can include hardware or hardware composites in data center racks that are placed as close to customers as possible with the edge infrastructure not being centralized.

As used herein interchangeable, the phrases and term "hardware composite" "hardware inventory" or "hardware" are not meant to be limited to any particular configuration of components, but broadly refers to any single device, compilation of devices (e.g., network devices, computing devices, and power-supply devices) and component thereof that may be integrated in a rack within the distributed computing infrastructure. Hardware composite, hardware inventory, or hardware can include individual hardware components that can be independently defined or configured as hardware with reference to functionality described herein. Although embodiments herein are described, by way of example, with edge infrastructures and some of the challenges specific therein, it is contemplated that the methods and systems described can be implemented in other types of infrastructures having hardware. In one instance, the hardware may be located within a private enterprise network managed by a customer of a cloud-computing-network service provider. In another instance, the hardware may be located within the datacenter managed by the cloud-computing-network service provider.

Edge infrastructure within a partner location of the cloud-computing-network service provider can present challenges in addressing failure to the hardware in the edge infrastructure. Edge infrastructure placed within partner locations can have different policies for access, control and operational standards for the hardware. As such, failures in hardware may not be addressed immediately in contrast to infrastructure that is fully-owned and/or operated by the cloud-computing-network service provider. Repair timelines for failed edge infrastructure hardware may be only performed in an ad-hoc basis and/or with possible delays up to several months. The result is limited maximization of the hardware that is marked as unhealthy (i.e., failed) and put offline until a technician performs repairs. Edge infrastructure hardware also frequently has limited backup hardware causing the impact of failed hardware in the edge infrastructure to be significant. For example, it is far more difficult to load balance workload in the edge infrastructure when several machines have failed and are offline.

Conventional methods for addressing hardware failures are based on immediately removing, replacing or repairing hardware or hardware composite components. This hardware failure strategy is primarily based on an abundance of hardware in data centers that are wholly-owned and controlled by the cloud-computing-network service provider or the capacity to immediately have access to the data centers. Yet, such a solution might not always be viable and alternative solutions could potentially be, in comparison, more efficient in certain situations. Further, with the increased implementation of edge infrastructures, the standard hardware failure strategy to immediately remove, replace or repair hardware in a wholesale manner may not be sustainable and an alternative approach is warranted.

Embodiments described herein are directed to simple and efficient methods, systems, and computer storage media for implementing an infrastructure management system that supports hardware failure remediation. At a high level, monitoring, degraded state provisioning and Return Merchandise Authorization (RMA) systems, processes and components are configured to support hardware failure remediation. The hardware failure remediation allows hardware composites to operate in a degraded state, where hardware components that are healthy in a hardware composite operate with failed hardware components in the hardware composite. The infrastructure management system supports a configuration schema that helps define configuration files for hardware. The configuration schema specifically includes a health model for hardware. The health model is a technical representation of the computing condition of the hardware. In particular, the health model defines a minimum operational bar for hardware based on health metrics or optional and required components associated with hardware. The minimum operational bar is used as a threshold for allowing hardware to run in a degraded state instead of failing the hardware composite completely. This results in maximizing the utilization of the hardware composite.

The infrastructure management system can be implemented for distributed computing system infrastructures (e.g., cloud computing infrastructures). The system can, in particular, be implemented for edge infrastructure that can be difficult to access to address hardware failures. Implementing hardware failure remediation can also advantageously improve the RMA system, in that, the infrastructure management system allows for opportunistic scheduling of repairs in distributed computing infrastructures for better hardware utilization and efficiency. Opportunistically scheduling repairs can include planning repairs to the hardware, such that, service level agreements (SLAs) with customers are not or are minimally impacted during repairs. Opportunistically scheduling repairs can also be based on availability of replacement hardware and technicians for performing repair operations.

Improving the availability and utilization of hardware is based on defining hardware resiliency. Hardware resiliency refers to relaxing the enforced health requirements on hardware. Hardware resiliency can be based on health metrics or optional and required components for hardware. For example, for a hardware composite, a health model can be defined having the following: health state, health metrics to be tracked, optional and required components, and a minimum operational bar, amongst other attributes. A hardware composite, upon failure, can include functional (healthy) components and failed (unhealthy) components. The functional and failed components can be evaluated and if the hardware composite still meets a minimum operational bar for the hardware, the hardware can be reconfigured and put back online to operate in a degraded state while pending RMA actions. Hardware resiliency can be in particular defined as part of configuration schema that supports defining a configuration file for hardware. The hardware resiliency as defined in the minimum operational bar can be defined in a remediation attribute of the configuration schema. Hardware resiliency may further be defined or adapted to agree or be consistent with service level agreement (SLA) of the tenants using the hardware. The SLAs refers to a contract between the cloud-computing-network service provider and the customer that defines expected service. For example, the optional components are defined for a stock-keeping unit (SKU) to keep the particular SKU online without the optional components, when the SKU still meets an agreed-upon service level and not merely having the SKU be operational. By way of example, a machine can include several hard drives that are part of a standard deployment and usually upon failure of the machine, the machine is taken offline. However, in instances described herein, the machine can be reconfigured to operate with less than all standard deployment drives, if the machine still meets the minimum operational bar. And, in some cases the minimum operational bar also has to meet SLAs of a tenant.

In operation, a determination is made that a failure of a hardware component has occurred. The hardware component is part of a hardware composite. A remediation attribute of the hardware composite is accessed. The remediation attribute indicates a minimum operational bar for the hardware composite. The minimum operational bar can be based on health metrics or on optional and required components of the hardware composite. The minimum operational bar supports determining whether the hardware composite should operate in a degraded state.

A determination is made that the hardware composite if operating without the hardware component that has failed still meets the minimum operational bar for the hardware composite. Operation of the hardware composite in a degraded state is initiated. The degraded state includes the hardware composite operating without the hardware component. In embodiments, hardware managers (e.g., an operating system) are associated with degraded state configurations to facilitate initiating operation and running the hardware composite in a degraded state. The degraded state configurations are defined in anticipation of the degraded state to support hardware composite operations and infrastructure management operations for the hardware composite running in the degraded state.

Accordingly, with reference to FIG. 1, the distributed computing infrastructure 100 supports an infrastructure management system platform that provides integrated functionality based on the components of the platform described herein. The distributed computing infrastructure 100 includes an infrastructure management system 110, an edge infrastructure 130, a central infrastructure 140, an administrator client 150, a vendor client 160, and customer clients (170a and 170b). The component described herein communicate using a network (not shown) that may include, without limitation, one or more local area networks (LANs) and/or wide area networks (WANs). Such networking environments are commonplace in offices, enterprise-wide computer networks, intranets and the Internet. Accordingly, the network is not further described herein.

Figure 6:
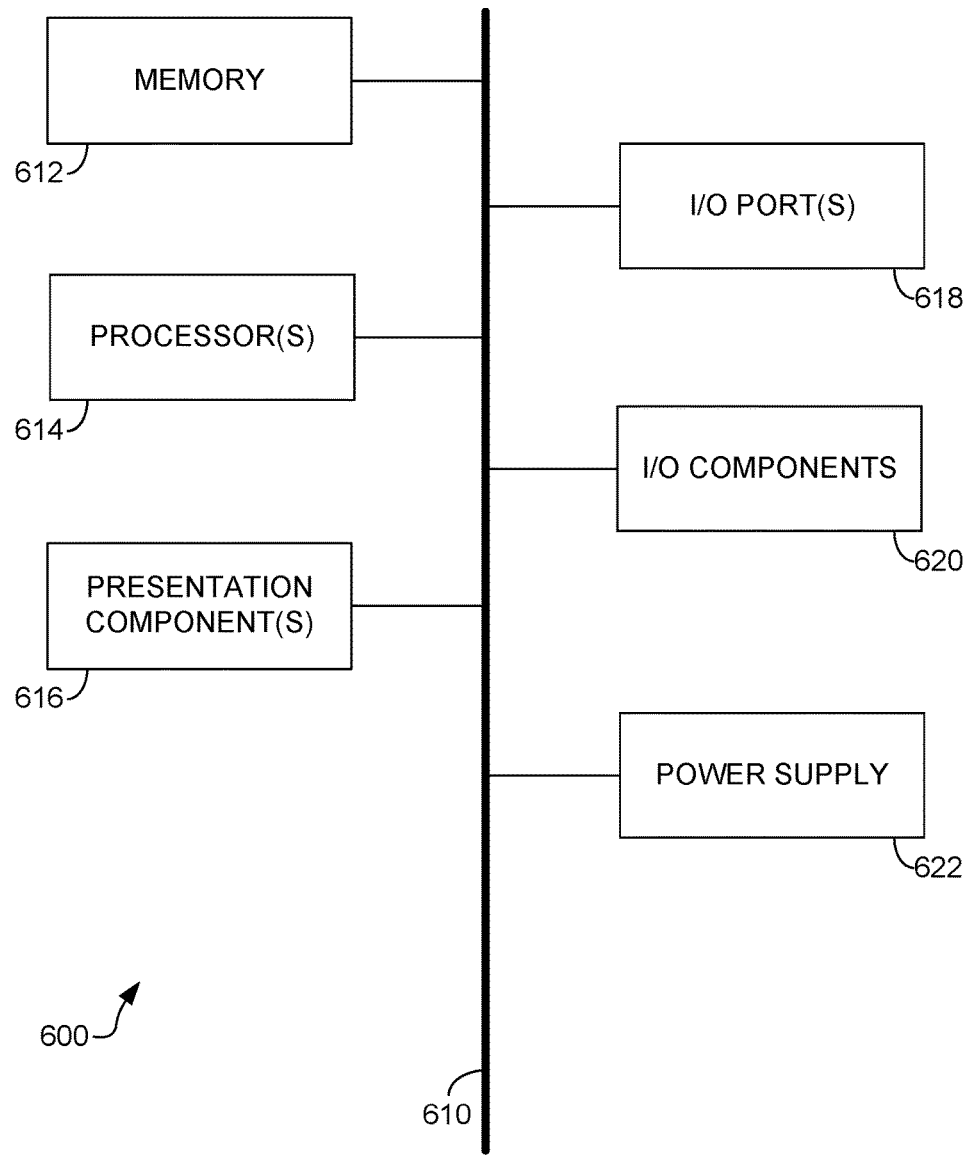
FIG. 6 is a block diagram of an exemplary computing environment suitable for use in implementing embodiments described herein.

The administrator client 150, vendor client 160 and customer clients (170a and 170b) may include any type of computing device 600 described herein with reference to FIG. 6, for example. The administrator client 150, vendor client 160 and customer clients (170a and 170b) can provide access to different components described herein. In particular, the administer client 150 and vendor client 160 may access the infrastructure management system 110 to perform one or more operations facilitated by the infrastructure management system 110, as described further herein. The customer client 150a may access resources in the distributed computing infrastructure 100 via the central infrastructure 140 and the customer client 150b can access resources in the distributed computing infrastructure 100 via the edge infrastructure 130, A platform as used herein refers to any system, computing device, process, or service or combination thereof. A platform may be implemented as hardware, software, firmware, a special-purpose device, or any combination thereof. A platform may be integrated into a single device or it may be distributed over multiple devices. The various components of a platform may be co-located or distributed. The platform may be formed from other platforms and components thereof.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The distributed computing infrastructure 100 can rely on an infrastructure management system 110 to implement hardware failure remediation. The infrastructure management system 110 is responsible for managing the hardware of the infrastructure (e.g., edge infrastructure). The infrastructure management system 110 can be implemented via a datacenter infrastructure management service to define and deploy hardware using configuration files having configuration attributes that express the requirements, health, remediation, and setup of a particular machine SKU. The administrator client 150 may facilitate configuring and managing operations of the infrastructure management system with the service, configuration schema, configuration files, and SKUs. A SKU can be used to describe hardware, hardware composites and hardware composite components in that the SKU represents attributes (e.g., manufacturer, product description, BIOS, firmware, configuration, material, size, color, packaging, and warranty terms) associated with the hardware and distinguish the hardware from other hardware. It is contemplated that a SKU can also refer to a unique identifier or code that refers to the particular stock keeping unit. The infrastructure management system 110 can in particular receive and store a configuration schema that includes a remediation attribute that indicates a minimum operational bar. The minimum operational bar can be based on health metrics or on optional and required components of the hardware composite for a particular machine SKU. In this regard, the minimum operational bar refers to a base health requirement having a subset of hardware components that are operational compared to a requirement to have a full set of hardware components that are operational. If a hardware composite fails but the hardware components therein meets the base operational requirement the hardware component will still be utilized, however if the base operational requirement is not met the hardware component will not be used.

Health metrics defined in a health model of hardware SKU can quantify the minimum operational bar that is used for a hardware remediation assessment. The minimum operational bar can be dynamic or static. The configuration file can be updated to indicate a different minimum operational bar based on a plurality of factors. For example, traffic patterns, the accessibility to edge infrastructure, tracked failure rates, administrative action, can be factors that determine a minimum operational bar and further support dynamic allocation of a minimum operation bar for a hardware SKU. As such, at least some hardware in the edge infrastructure can be associated with a health model to indicate a minimum operational bar. In this regard, hardware composite failures do not fail the entire hardware composite unless the hardware failure results in the hardware composite operational bar falling below the minimum operational bar as indicated by the health metric.

By way of example, a machine associated with 4 physical disks can have a health model that indicates to the infrastructure management system to monitor the number of healthy disks as the associated health metric. The health model based on the health metric may define a minimum operational bar as the machine running with at least 2 disks. In this regard, up to 2 disks may fail on the machine and the machine can still remain operational or reprovisioned to operate with 2 disks. Reprovisioning can be part of the overall remediation operations for the hardware composite such that the hardware composite operates in a degraded state. It is contemplated that an SLA agreement may be a factor in defining the minimum operational bar. For example, if an SLA further requires at least 3 disks for a machine, then even though the machine may operate with 2 disks, because the machine fails to meet the SLA, the machine may be associated with a minimum operational bar of 3 disks for the tenant associated with the SLA. As such, it may be possible to decommission a hardware composite for use with a first tenant having a first SLA but not decommission (or the reprovision) the same hardware composite for a second tenant having a second SLA. Other variations and combinations of defining and implementing minimum operational bars are contemplated with embodiments described herein.

A degraded state configuration can include configuration in the distributed computing system infrastructure that are defined to accommodate hardware failure remediation. Degraded state configuration can be associated with hardware managers (e.g., an operating system, hypervisors, fabric controllers, RMA portals), as discussed herein, in anticipation of a degraded state. The degraded state configuration can specifically include instructions for how the hardware manager should configure and operate the hardware composite when the hardware composite is operating in the degraded state which is different from a non-degraded state. For example, physical disks are not statically mapped to logical drives to account for operating in a degraded state if a disk failure occurs. In this regard, the degraded state configuration can be pre-configured or defined within a hardware manager. In embodiments, the degraded state configuration may be preemptively configured to alter legacy configurations of the hardware managers in anticipation of running hardware in a degraded state.

Degraded state configuration can be associated with a datacenter manager. The datacenter manager can define a new designation or label for capturing the status of healthy hardware composites associated with unhealthy hardware components. The datacenter manger can label a hardware component as healthy or unhealthy but further include a hardware component property field ("property field" or "machine property") to indicate that hardware components of the hardware are unhealthy. Also labeling hardware composite having hardware components with a property field can help indicate failed hardware components such that the failed hardware components are not monitored and also failed hardware components can be replaced under RMA as discussed below. By way of example, server, additional property fields can indicate missing disks and bad disks. During monitoring, a watch dog service operates to read property fields and avoid reporting errors for the disks that are already marked as bad or missing. The infrastructure management system, based on a degraded state configuration attribute, can target an edge infrastructure (e.g., edge SKUs and environments) for hardware remediation functionality while excluding a centralized infrastructure. The configuration schema can include a hardware remediation functionality trigger attribute. The configuration files based on the configuration schema, for hardware components and SKUs can specifically define the trigger attribute to indicate when hardware remediation functionality should apply to specific hardware infrastructure. In this regard, the degraded state configuration in distributed computing system components can support executing hardware composite operations and infrastructure management operations for the hardware composite running in the degraded state.

The infrastructure management system 100 can operate in combination with an existing RMA to support RMA, based at least in part, on hardware failure remediation functionality described herein. The RMA as part of the infrastructure management system 100 supports opportunistic RMA operations and immediate RMA operations. The RMA can leverage the property field of hardware composites to identify specific health state information of hardware components of the hardware composite that have to be processed under RMA. Opportunistically scheduling repairs can include planning repairs to the hardware composite such that service level agreements (SLAs) with customers are not or only minimally impacted during repairs. For example, under conventional models, hardware that is identified as failed is taken offline and this impacts the SLA and maybe even cause the SLA to no longer be met. With the infrastructure management system, the hardware is allowed to run in the degraded state as long as the hardware meets the minimum health requirements. As a result, scheduling and performing repairs for the hardware can be implemented such that the SLA is still being met. Immediate RMA operations can operate to repair the hardware immediately to full health. In embodiments, the immediate RMA operations are based on following the SLA requirements for the tenant associated with the hardware. The tenant can be removed from the hardware while repairs are performed such that tenant does not experience any unexpected failures.

With continued reference to FIG. 1, the infrastructure management system 110 can include a plurality of components that support providing hardware failure remediation functionality as described herein. The infrastructure management system 110 include a watch dog component 112 (WD 112), a datacenter manager component 114 (DM 114) a repair service component 116 (RS 116), a provisioning service component 118 (PS 118), and an RMA component 120 (RMA 120). The infrastructure management system 110 uses the configuration schema and corresponding configuration files to monitor, configure, repair, provision, and provide state information for RMAs for the hardware. In embodiments, the configuration schema is based on SKU and configuration attributes as described herein. The configuration schema includes a remediation attribute that indicates a minimum operational bar for the hardware composite. The minimum operational bar can be based on health metrics or on optional and required components of the hardware composite. The minimum operational bar supports determining whether the hardware composite should operate in a degraded state.

The failure life cycle can be described, by way of example, with reference to disks in a machine or node. For example, at a high level, WD 112 can access the configuration schema, and based on the configuration schema, perform a health check on disks to ensure a minimum required number of disks are healthy. The configuration schema, in particular, can specify based on the SKU definition the number of required disks and the number of optional disks. The configuration schema can be based on SLA with tenants such that the hardware in a degraded state can handle variance of optional disks. The WD 112 can report that some disks have failed but the minimum required, number of disks, are healthy. Based on the health information report that the hardware composite meets the minimum operational bar, the PS 118 reprovisions the hardware and mounts the disks that are healthy. PS 118, during degraded state provisioning, uses the health state information from the WD 112 and the configuration schema to provision the hardware composite in the degraded state. As such, the hardware composite running in the degraded state minimizes the impact of the changes to the tenant.

A degraded state configuration can be associated with hardware managers (e.g., an operating system, hypervisors, fabric controllers), as discussed herein, in anticipation of a degraded state. In one exemplary implementation, degraded state configuration is supported via the configuration schema and corresponding configuration file. For example, in the specific scenario of disks and an operating system supporting the disks, the configuration schema breaks the static mapping between physical drives and logical drives (volumes). Depending on the health of the machine, different physical drive slots serve as the system volume. As long as enough physical disks are healthy to satisfy the minimum required logical drive and volume metrics, the machine will be utilized and marked as healthy. Volumes and logical drives in the optional category may not always be created and the tenant application is aware of such a configuration and expects that the volumes might not exist. As such, it is contemplated that the operating system and other applications that operate with hardware at full capacity are aware or made aware (i.e., programmed and reconfigured), as needed, to accommodate and tolerate the hardware when the hardware is running in the degraded state. For example, the operating system can be preconfigured to boot to any drive in anticipation of an event where the boot drive fails, as such, allowing recovery to a degraded state to any drive.

An example implementation based on an exemplary hardware SKU of 4 JBODs (Just a Bunch of disks). The hardware can operate and serve traffic as long as 2 disks are online and healthy. This evaluation can be based on testing and/or meeting expected SLAs. The base requirement for the SKU would be 2 disks and the remaining 2 disks would be considered as optional. In embodiments, to accommodate such flexibility, physical drives are not statically mapped to logical drives. There may be no fixed mapping of disk controller slot to logical disk, but the assignment is consistent. The lowest functional disk controller slot can be marked as logical disk 0. If physical disk 0 exposed from the controller is unhealthy, then physical disk 1 exposed from the controller becomes the logical disk 0. As long as a consistent hard drive verification check is performed and the machine event audit logs can be accessed, no additional state may be stored to calculate the mapping as it is a consistent algorithm.

In another example, the hardware SKU having 4 disks may have all 4 disks fail. The minimum operational bar can indicate that the hardware SKU is operational at a degraded state with only 2 of the 4 failed disks running. Practically it can be advantageous, in certain scenarios, to at least repair a portion of the hardware. In particular, the hardware can be repaired to meet the minimum operational bar. In this regard, the entire hardware SKU is not lost. Similarly, a portion of hardware within a deployment rack can be repaired, for an interim period, prior to repairing the rest of the hardware. For example, if 10 degraded blades exist within a rack, the remediation operations can include repairing 2 blades to have enough blades to have the rack stay operational instead of repair all 10 blades at the same time. Having the portion of the hardware repaired and operational can also be based on specifically meeting SLAs of tenants associated with the hardware.

The configuration file specifies that the base requirement as having healthy logical disk 0 and 1 whereas disk 2 and 3 are optional. The volume specification remains unchanged in that respect. The volumes are still created based on the logical disk assignment. If there is no matching logical disk for the prescribed volume, then the volume is not created. The physical to logical disk section schema can be extended, the volume information remains the same. As stated above, the local operating system can be configured to expect that the optional volumes might not be present and adjust the behavior based on what volumes have been provisioned. The tenant can make the assumption though that the base requirement of volumes will always be present on a healthy node.

Prior to a provisioning phase of the degraded state, the WD 112 can access the machine 210 state information in DM 114 and the configuration file to make decisions about health metrics. The key difference is that depending on the machine state stored in DM, the health requirements and WD 112 behavior will change. If hardware components are marked as bad in DM 114, WD 112 may not monitor the unhealthy components. WD 112 monitors only the healthy hardware and reports any failures to DM. In the specific case of disks, WD only monitors the disks that are marked as healthy in DM and provisioned. Once an issue is detected, WD 112 as in the previous workflow reports the hardware problem to DM 114. WD 112 can be configured to reports all hardware issues. The RS 116 can attempt to fix the issue following an escalating resolution pattern. In the final mitigation scenario, the RS 116 can requests PS 118 to reprovision (i.e., the degraded state provisioning) the machine.

Figure 2B:
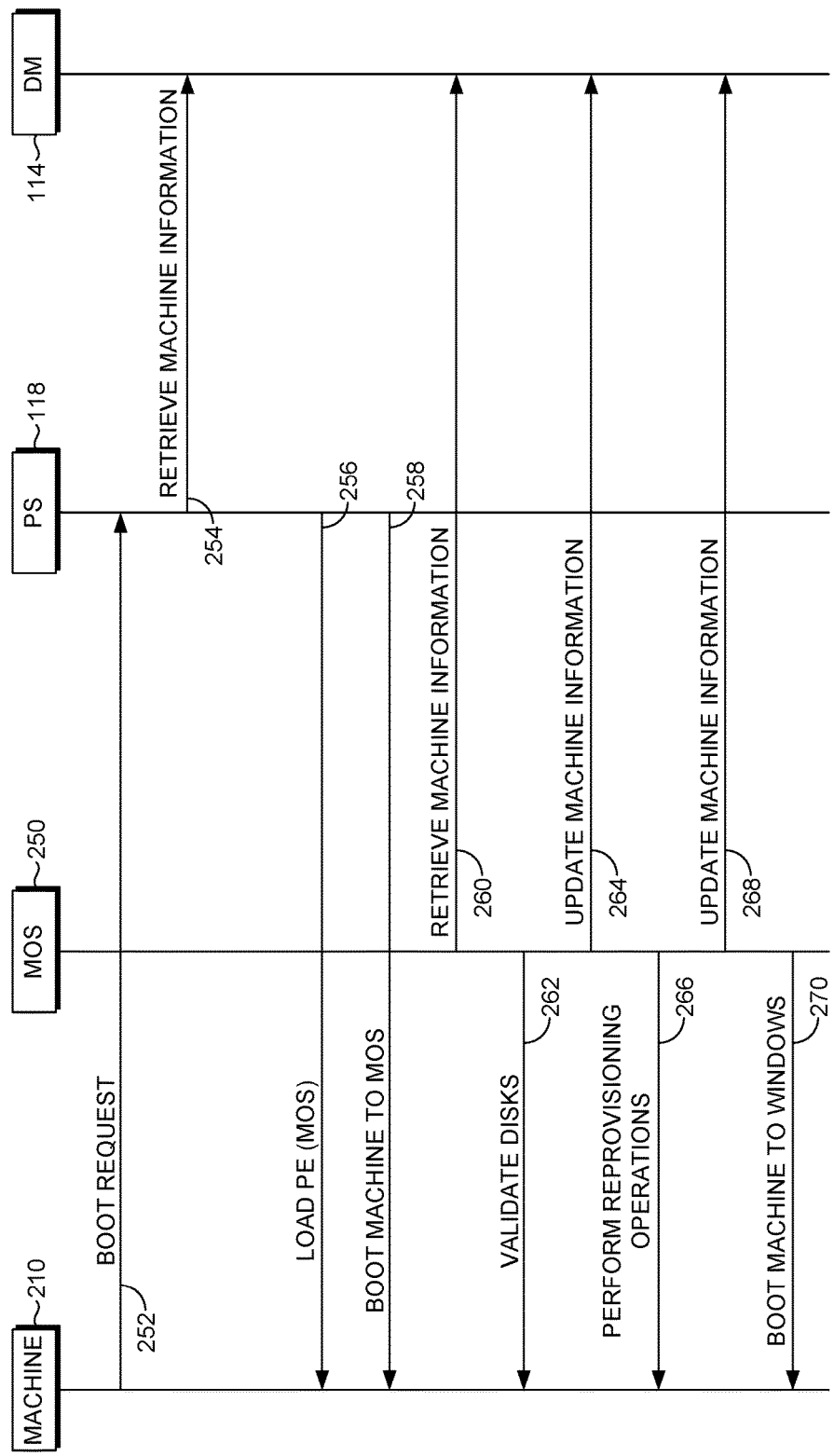

With reference to FIGS. 2A and 2B, FIGS. 2A and 2B illustrate a method for implementing an infrastructure management system. DM 114 is responsible for managing hardware in the distributed computing infrastructure. The DM 114 is responsible for receiving and storing the configuration schema for the hardware. The configuration schema may be developed for the particular SKU of the hardware or hardware composite having individual hardware composite components (e.g., a physical machine has disks, NICs (Network Interface Controller), memory, processors, chips etc.). DM 114 also operates as a repository for health state information. The distributed computing infrastructure can include machine 210 that is supported for hardware remediation functionality. Machine 210 is meant to be an exemplary hardware or hardware composite in keeping with the functionality described herein. DM 114 stores and provides access to health state information of hardware infrastructure (e.g., edge infrastructure 130). The health state information is based on a configuration schema and configuration file for corresponding hardware of the hardware infrastructure. The configuration schema can be defined based on a health model and SKUs as described herein.

At step 212, WD 112 accesses and retrieves health state information from DM 114 to determine healthy hardware in the hardware infrastructure to selectively monitor. WD 112 operates based on configuration information to monitor and report on any hardware failures. It is contemplated that WD 112 also reports the health SLA failures to the DM that are optionally factored in a determination to label a hardware component as healthy or unhealthy, as described herein in more detail. At step 214, the WD 112 utilizes configuration files and a health state of hardware to determine how to monitor the edge infrastructure. For example, WD 112 determines which hardware and hardware components are healthy and need to be monitored and also what health metrics and/or health SLAs are to be monitored, especially health metrics and/or health SLAs associated with hardware remediation functionality. At step 216, WD 112 monitors the edge infrastructure, machine 210, to identify failed hardware components.

At step 218, based on monitoring, the WD 112 can detect failure of a hardware component in a hardware composite (e.g., a machine component in machine 210). The infrastructure management system 110 includes a configuration schema that provide flexibility to define certain hardware components as required and other hardware components as optional and further health metrics for hardware components and corresponding threshold conditions. Hardware failures can be mapped to the optional category of hardware component or a certain health metric threshold condition (e.g., minimum operational bar). The optional hardware identified in the mapping indicates the hardware components that can fail and the hardware composite be recovered without having to immediately repair the optional hardware. As such the machine continues to be operational as long as the required components and health metrics are met. For example, specific disks that are mapped to the optional requirement can fail while the machine is still marked as healthy, similar number of disks that are determined as at or above a minimum operational bar can fail while the machine is still marked as healthy. As such, the hardware composite may be marked as unhealthy (or taken offline) only when the minimum operational bar is not met. For example, the WD 112 can monitor the machine 210 and the infrastructure management system can ensure that the minimum required number of disks is healthy. Or when the minimum operational bar is defined based on optional components and required components, any optional components that are marked as unhealthy will not lead to the machine being marked as unhealthy. WD 112, at step 220, reports the detected hardware failure to DM 114. Prior to processing the machine 210 for reprovisioning, an attempt can be made to repair the machine 210. It is contemplated that the repair service step may be optional for some or all types of hardware composites.

RS 116 operates to perform repair operations (e.g., restart system services, soft reboot and hard reboot). In an exemplary implementation, soft reboot may specifically refer to software reboot and hard reboot may refer to a hardware reset. At step 222, RS 116 accesses health state information (e.g., pull hardware state) for hardware from DM 114 and attempts, at step 224, repair actions to repair the failed hardware component. When repair actions fail, as shown at step 226, RS 116 can communicate, at step 228, a request to perform remediation operations the hardware component. At step 230, PS 118 initiates remediation operations for the machine 210 (i.e., the hardware composite including the failed hardware component). Remediation operations (e.g., reprovisioning) can refer to degraded state reprovisioning of functional hardware components of the hardware composite while excluding failed hardware components. Reprovisioning can be based on configuration files in DM 114 and health state information updated via WD 112. The configuration files are used to verify configuration attributes. The functional hardware components are marked as healthy so that the infrastructure is not exposed to unhealthy hardware components for operation or monitoring. If the additional hardware issues are detected during reprovisioning, PS 118 may fail the reprovisioning operations and mark the machine 210 as unhealthy, and take the machine 210 out of rotation.

At step 232, PS 118 initiates reprovisioning operations to attempt to reprovision the machine 210. In one exemplary implementation, as part of reprovisioning, PS 118 loads a pre-execution environment (PXE) onto the machine 210. At step 234, the pre-execution environment accesses the failure information stored in DM 114. Based on the type of failure, the pre-execution environment alters the conventional provisioning behavior. By way of example, the pre-execution environment verifies, at step 236, the health of the disks on the machine. If the disks do not pass the health requirements but has not been marked in DM 114 as unhealthy, the pre-execution environment marks the disk as unhealthy.

The remaining healthy disks are compared to the base health requirement (e.g., minimum operational bar) for the machine SKU. If the number of healthy disks matches the number required by the base health requirement, then the provisioning processes continues. The pre-execution environment will proceed with formatting and provisioning the disks. The pre-execution environment can use bootstrapping tools to, at step 238 modify, the BIOS settings and boot order to enable the machine to operate on the newly elected system disk. At step 240, the WD 112 no longer monitors the failed disk, and the machine 210 communicates an indication that the reprovisioning was successfully completed to PS 118. At step 242, a communication is sent to RS 116 indicating the reprovision has succeeded.

Figure 3:
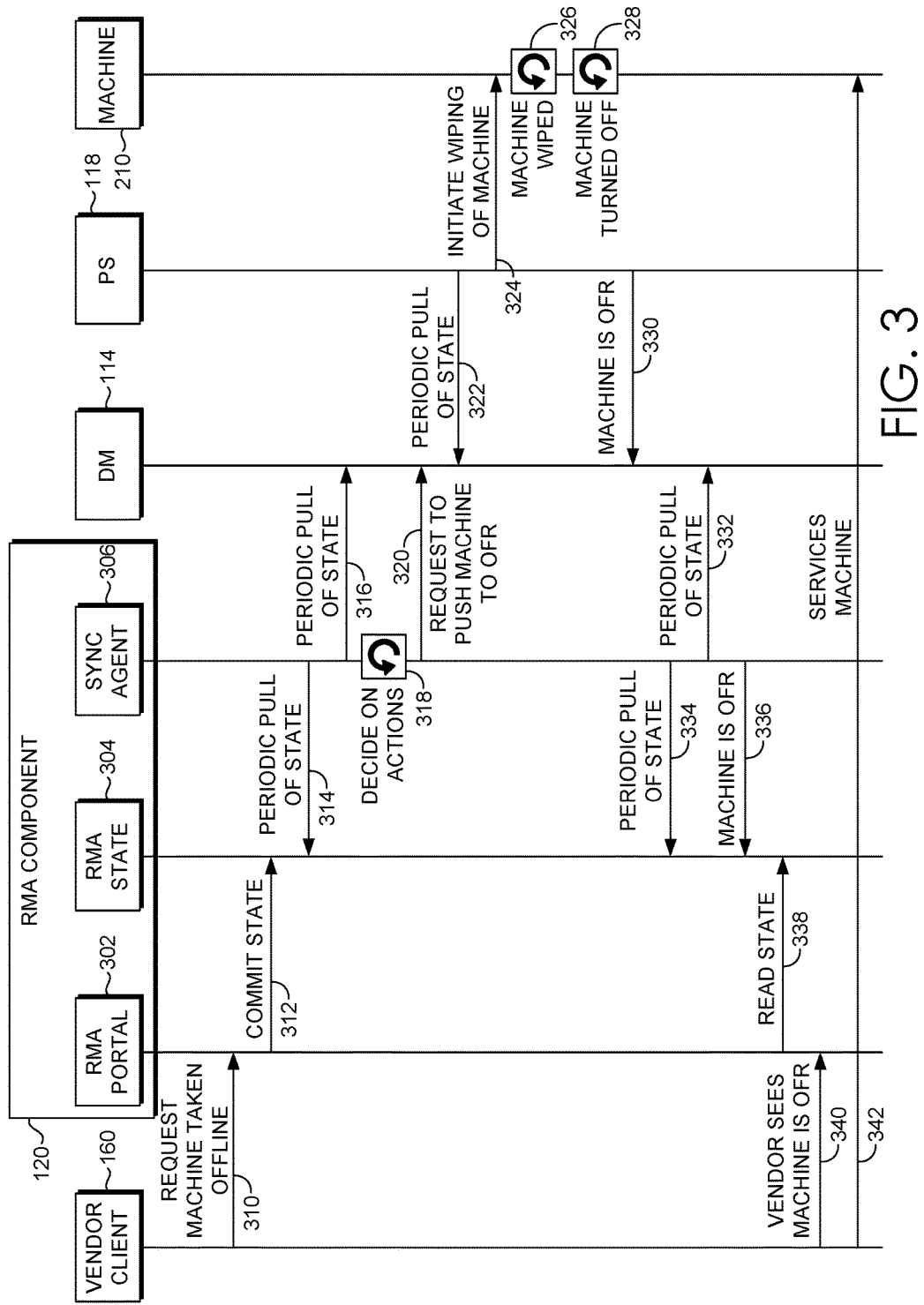
FIG. 3 is a block schematic of an exemplary implementation of an infrastructure management system for hardware failure remediation, in accordance with embodiments described herein.

With reference FIG. 2B, an exemplary reprovisioning implementation is illustrated for the infrastructure management system 110. FIG. 3 includes the machine 210, the machine operating system 210 (MOS 250), PS 118 and DM 114. The degraded state provisioning can, in one embodiment, include specific exemplary implementation details. When the machine 210 boots, the machine, at step 252, communicates PXE boot requests. PS 118 receives the requests and accesses (and/or updates), at step 254, the machine information from DM 114 to decide on the response. PS 118 selects to load, at step 256, a pre-installation environment (PE) image onto the machine and updates the state in DM 114 to reflect the action. After the PE image is finished loading, the machine 310 is booted, at step 258, into PXE. MOS 310, at step 260, accesses and retrieves the machine's configuration file and DM 114 for the machine's health. MOS 310, at step 262, performs diagnostics to validate the life and health of the disk. At step 264, machine information updates are communicated to DM 114. For example, any disks that are detected as unhealthy that are not marked in DM 114 as unhealthy are marked accordingly in DM 114. The remediation operations includes verifying that the number of healthy physical disks matches the base requirement of healthy disks as specified in the configuration file. As long as the base number of healthy disks exist, it continues with the provisioning process.

At step 266, the process sets up and provisions only the healthy drives. For example, the MOS 310 selects the first healthy physical disk to act as logical disk 0 to host the system volume. The provisioning process downloads an operating system image and installs the operating system on the system volume. The remaining healthy disks are provisioned as the remaining volumes in order, i.e. next healthy physical disk corresponds to logical disk 1 and it's matching volumes. After setting up the drives, the MOS 310 changes the boot settings to ensure that the first healthy physical disk is marked as the system boot disk. At step 268, the MOS 310 updates machine 210 information in DM 114, and at step 270, the MOS 310 boots the machine to the operating system.

With reference to FIG. 3, FIG. 3 illustrates an implementation of an infrastructure management system for hardware failure remediation. In particular, FIG. 3 illustrates an RMA workflow for the infrastructure management system. FIG. 3 includes a vendor client 160, DM 114, PS 118 and machine 210. FIG. 3 also includes RMA component 120 having an RMA portal 302, RMA state 304 and sync agent 306. RMA 120 provides an RMA portal that operates as a gateway or access point to view the state of hardware in the distributed computing system. The RMA portal can provide access to view unhealthy hardware set to RMA. The RMA portal tracks and exposes the state of hardware. The state of the hardware is stored in RMA state 304. The sync agent 306 facilitates reconciling state changes between the RMA 120 and DM 114. Vendor client 160 has access via a public accessible portal to the DM 114 that stores health state information for hardware.

As discussed herein, hardware supported using the infrastructure management system can operate in a degraded state. The hardware can serve live traffic but have unhealthy hardware components. The RMA 120 allows hardware to be labeled with two types of state information—"Degraded" and "PendingRMA"—to support hardware failure remediation via the RMA component. The Degraded state indicates that a machine is running with failed hardware components, and the PendingRMA indicates that a vendor has requested the machine to be moved to OFR (out-for-repair). A vendor can also access the infrastructure management system and move the hardware from the "PendingRMA" state to immediate "RMA" based on SLA requirements of the tenant associated with the hardware. The tenant can be removed from the hardware while repairs are performed on the hardware such that the tenant does not encounter unexpected failures.

With continued reference to FIG. 3, initially at step 310, a vendor via vendor client 160 may request to take hardware (e.g., machine 210) offline. When vendor (i.e., a servicing technician) requests to move the target machine 210 to OFR in DM 114, the RMA portal, at step 312, updates or commits the state to PendingRMA in the RMA portal. The sync agent 306 is configured periodically pull state information, as shown at step 314, from RMA state 304. DM 114 is also configured to periodically pull state information, as shown at step 316, from DM 114. At step 318, the RMA 120 then determines which action to take for hardware with Pending RMA state. When the DM 114 state is healthy (as at least one hardware component is still operational), RMA 120 can update, at step 320, DM 114 to request the hardware to be moved to OFR in DM 114. PS 118 is also configured to periodically pull state information from DM 114. As such, PS 118 picks up the state change, as shown in step 322, for the machine and starts the deprovisioning process of the machine, at step 324. For example, at step 324, PS 118 may communicate a request to initiate a wipe of the machine, and at step 326, the machine 210 is wiped. At step 328, the machine may optionally be then turned off.

With continued reference to the exemplary implementation with the machine 210, after the machine has finished deprovisioning and shut down, PS 118 notifies, at step 330, DM 114 that the machine 210 is in OFR in DM 114. When DM 114 state is OFR, RMA 120 can update the RMA portal, via steps 332, 334, 336, and 338 that show periodically pulling of state information, to mark the machine as OFR, which will be shown in the portal subsequently. The vendor client 160, at step 340 can retrieve the state information from RMA 102 such that the vendor can start servicing, at step 342, the machine after seeing the state update. It is contemplated that the RMA portal 302 may not provide feedbacks to the user other than showing the machine is in the "Pending RMA" state.

The RMA 120 synchronizes the state between RMA portal and DM 114. To support opportunistic RMA, RMA can be configured to start querying property field (e.g., machine properties) to identify machine that are in the "Degraded" state. In addition, the opportunistic RMA machine properties can be persisted to RMA error description as they are essentially hardware errors. The actions to be taken by the RMA service depend on the machine's RMA state and DM state.

Figure 4:
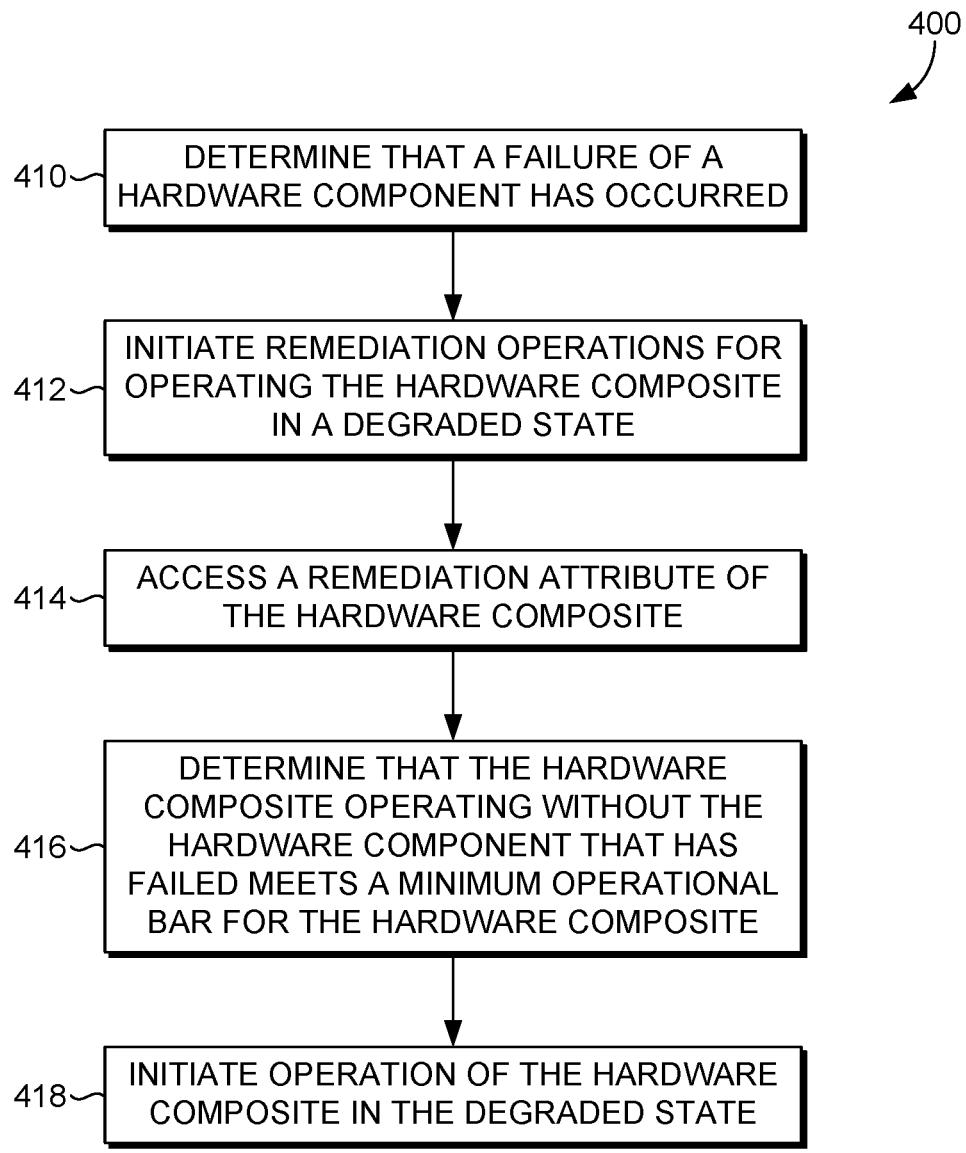
FIG. 4 is a flow diagram showing an exemplary method for implementing an infrastructure management system for hardware failure remediation, in accordance with embodiments described herein.

Further, as discussed above, by way of example, if a machine has the base disk health requirements, the infrastructure management system may implement an agent service using PS 118 (e.g., PsAgent) to determine whether the base health requirements are met. If so, PS 118 will complete provisioning using less hard disks and let machine run in the degraded state. For each degraded machine, PsAgent will set machine properties in DM to mark how many disks are missing, and what disks are having errors. WD 112 monitors the number of disks and the required volumes. WD 112 can be updated to skip validation of disks that are not in use, i.e., the disks persisted in the opportunistic RMA machine properties Turning now to FIG. 4, a flow diagram is provided that illustrates a method for implementing functionality of an infrastructure management system for hardware failure remediation. Initially at block 410, a determination is made that a failure of a hardware component has occurred. The hardware component is part of a hardware composite. At block 420, remediation operations for operating the hardware composite in a degraded state are initiated. The degraded state includes the hardware composite operating without the failed hardware component. At block 430, a remediation attribute for the hardware attribute is accessed. The remediation attribute indicates a minimum operation bar for the hardware composite. A configuration schema includes a plurality of attributes for defining a configuration file for corresponding hardware composites. The plurality of attributes includes the remediation attribute that indicates the minimum operational of the hardware composite. The health model is a representation of the computing condition of the hardware composite. The minimum operational bar is defined based on health metrics or optional and required components associated with the hardware composite.

At block 440, a determination that the hardware composite operating without the hardware component that has failed meets a minimum operation bar for the hardware composited, is made. At block 450, operation of the hardware composite in the degraded state is initiated. The degraded state includes the hardware composite operating without the failed hardware component. A hardware manager associated with the hardware composite is pre-configured with degraded state configuration in anticipation of the degraded state for operating the hardware composite. The degraded state configuration comprises instructions for operating the hardware composite in the degraded state.

Figure 5:
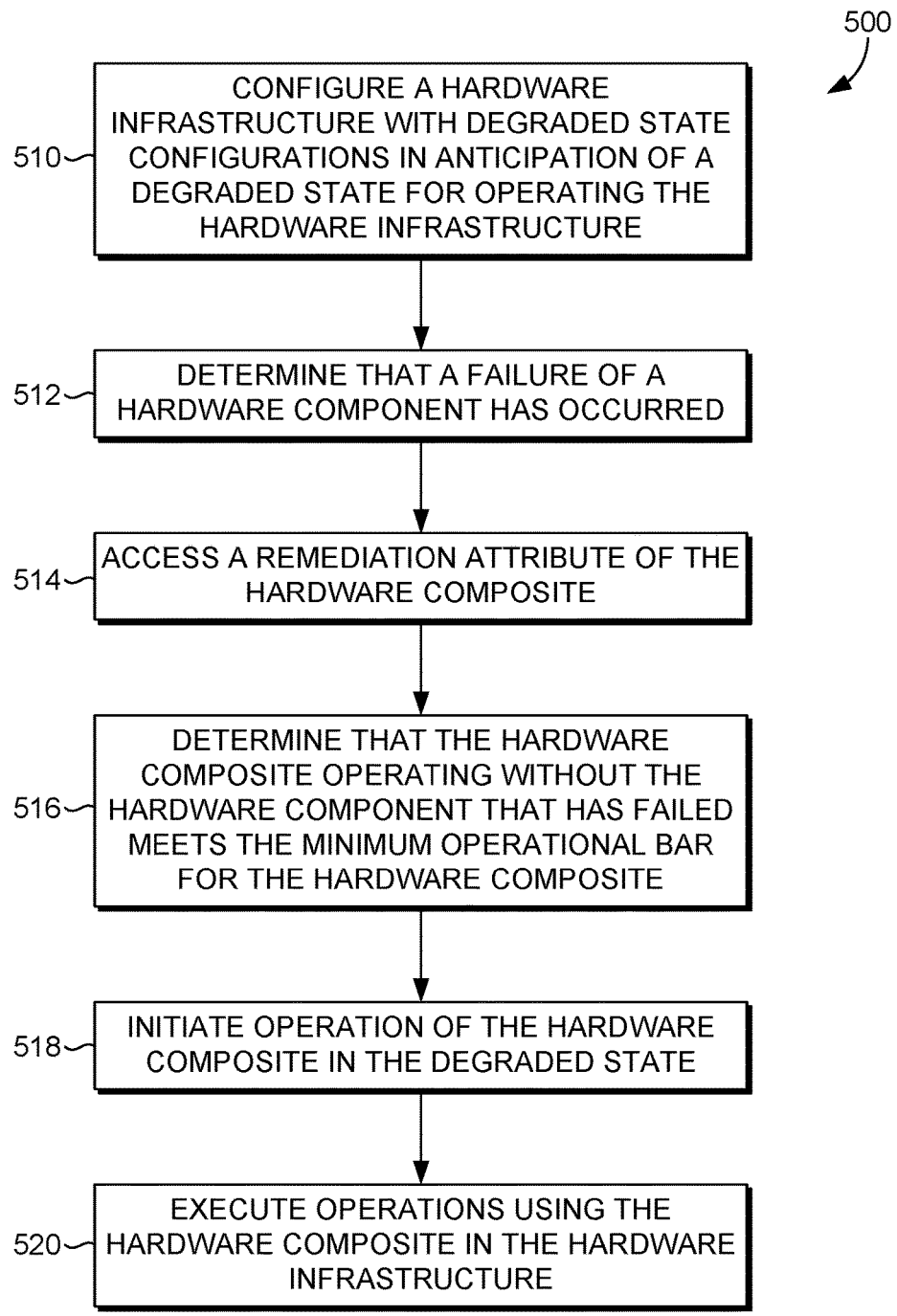
FIG. 5 is a flow diagram showing an exemplary method for implementing an infrastructure management system for hardware failure remediation, in accordance with embodiments described herein.

Turning now to FIG. 5, a flow diagram is provided that illustrates a method for implementing functionality of an infrastructure management system for hardware failure remediation. Initially at block 510, a hardware infrastructure is configured with degraded state configuration in anticipation of a degraded state for operating the hardware infrastructure. The degraded state configurations comprise instructions for operating the hardware infrastructure in the degraded state. At block 520, a determination that a failure of a hardware component has occurred is made. The hardware component is comprised in a hardware composite of the hardware infrastructure. At block 530, a remediation attribute is accessed. The remediation attribute indicates a minimum operational bar for the hardware composite. At block 540, a determination that the hardware composite operating without the hardware component that failed meets the minimum operational bar for the hardware composite, is made. At block 550, operation of the hardware composite in the degraded state is initiated. The degraded state includes the hardware composite operating without the hardware component. At block 560, operations are executed using the hardware composite in the hardware infrastructure. Executing the operations is based at least in part on the degraded state configurations.

With reference to the infrastructure management system, embodiments described herein allows for hardware failure remediation. The infrastructure management system service platform components refer to integrated components for providing hardware failure mediation. The integrated components refer to the hardware architecture and software framework that support data access functionality using the infrastructure management system service platform. The hardware architecture refers to physical components and interrelationships thereof and the software framework refers to software providing functionality that can be implemented with a hardware device running the software. The end-to-end software-based infrastructure management system service platform can operate within the infrastructure management system service platform components to operate computer hardware to provide infrastructure management system service platform functionality. As such, the infrastructure management system service platform components can manage resources and provide services for the infrastructure management system functionality. Any other variations and combinations thereof are contemplated with embodiments of the present invention.

By way of example, the infrastructure management system service platform can include an API library that includes specifications for routines, data structures, object classes, and variables may support the interaction the hardware architecture of the device and the software framework of the infrastructure management system service platform system. These APIs include configuration specifications for the infrastructure management system service platform system such that the driver component and component therein can communicate with each other in the infrastructure management system service platform, as described herein.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is only one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Figure 7:
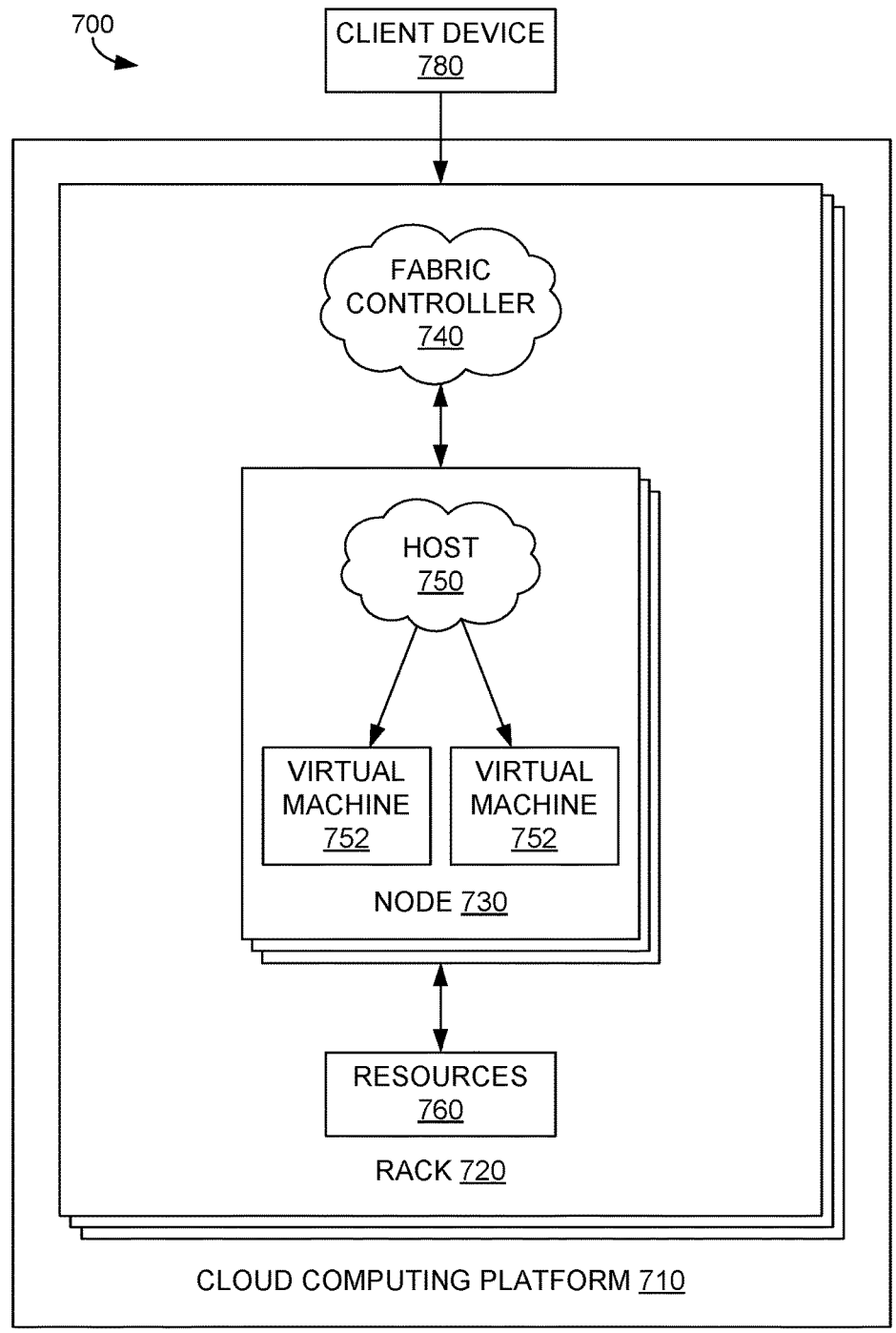
FIG. 7 is a block diagram of an exemplary distributed computing system suitable for use in implementing embodiments described herein.

Referring now to FIG. 7, FIG. 7 illustrates an exemplary distributed computing environment 700 in which implementations of the present disclosure may be employed. In particular, FIG. 7 shows a high level architecture of the infrastructure management system ("system") in a cloud computing platform 710, where the system supports seamless modification of software component. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 700 (e.g., centralized infrastructure and edge infrastructure) that includes the cloud computing platform 710, rack 720, and node 730 (e.g., computing devices, processing units, or blades) in rack 720. The system can be implemented with a cloud computing platform 710 that runs cloud services across different data centers and geographic regions. The cloud computing platform 710 can implement a fabric controller 740 component for provisioning and managing resource allocation, deployment, upgrade, and management of cloud services. Typically, the cloud computing platform 710 acts to store data or run service applications in a distributed manner. The cloud computing infrastructure 710 in a data center can be configured to host and support operation of endpoints of a particular service application. The cloud computing infrastructure 710 may be a public cloud, a private cloud, or a dedicated cloud.

The node 730 can be provisioned with a host 750 (e.g., operating system or runtime environment) running a defined software stack on the node 130. Node 730 can also be configured to perform specialized functionality (e.g., compute nodes or storage nodes) within the cloud computing platform 710. The node 730 is allocated to run one or more portions of a service application of a tenant. A tenant can refer to a customer utilizing resources of the cloud computing platform 710. Service application components of the cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 730, the nodes may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in the cloud computing platform 710. It is contemplated that resources can be configured for specific service applications. Further, each service application may be divided into functional portions such that each functional portion is able to run on a separate virtual machine. In the cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 180 may be linked to a service application in the cloud computing platform 710. The client device 780 may be any type of computing device, which may correspond to computing device 700 described with reference to FIG. 7, for example. The client device 780 can be configured to issue commands to cloud computing platform 710. In embodiments, client device 780 may communicate with service applications through a virtual Internet Protocol (IP) and load balancer or other means that directs communication requests to designated endpoints in the cloud computing platform 710. The components of cloud computing platform 710 may communicate with each other over a network (not shown), which may include, without limitation, one or more local area networks (LANs) and/or wide area networks (WANs).

Having described various aspects of the distributed computing environment 700 and cloud computing platform 710, it is noted that any number of components may be employed to achieve the desired functionality within the scope of the present disclosure. Although the various components of FIG. 7 are shown with lines for the sake of clarity, in reality, delineating various components is not so clear, and metaphorically, the lines may more accurately be grey or fuzzy. Further, although some components of FIG. 7 are depicted as single components, the depictions are exemplary in nature and in number and are not to be construed as limiting for all implementations of the present disclosure.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing infrastructure having an infrastructure management system; however the infrastructure management system depicted herein is merely exemplary. Components can be configured for performing novel aspects of embodiments, where configured for comprises programmed to perform particular tasks or implement particular abstract data types using code. Further, while embodiments of the present invention may generally refer to the infrastructure management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing an infrastructure management system that supports hardware failure remediation, the system comprising:
   an infrastructure management component configured to:
   determine that a failure of a hardware component has occurred, the hardware component is comprised in a hardware composite;
   initiate remediation operations for operating the hardware composite in a degraded state, wherein the degraded state includes the hardware composite operating without the failed hardware component;
   access a remediation attribute of the hardware composite, wherein the remediation attribute indicates a minimum operational bar for the hardware composite, wherein a plurality of different types of hardware composites are configured with corresponding minimum operational bars for hardware components in the different types of hardware composites;
   determine that the hardware composite operating without the hardware component that has failed meets a minimum operational bar for the hardware composite; and
   initiate operation of the hardware composite in the degraded state, wherein the degraded state includes the hardware composite operating without the failed hardware component.

2. The system of claim 1, wherein a configuration schema comprises a plurality of attributes for defining a configuration file for corresponding hardware composites, the plurality of attributes includes the remediation attribute that indicates the minimum operational bar from a health model of hardware composite, wherein the health model is a representation of the computing condition of the hardware composite.

3. The system of claim 1, wherein the minimum operational bar is defined based on health metrics or optional and required components associated the hardware composite.

4. The system of claim 1, wherein a hardware manager associated with the hardware composite is pre-configured with degraded state configurations in anticipation of the degraded state for operating the hardware composite, wherein the degraded state configuration comprises instructions for operating the hardware composite in the degraded state.

5. The system of claim 1, further comprising:
   a datacenter manager component configured to:
   provide access to health state information and configuration files for hardware composites, wherein the health state information comprises health state information for individual healthy hardware components and unhealthy hardware components of the hardware composite;
   a watch dog component configured to:
   access the health state information for hardware composites;
   selectively monitor hardware components of a hardware composite where the health state information indicates the hardware components that are healthy; and
   report failures in the hardware composite, wherein at least one failure is a based on a health SLA failure of the hardware composite.

6. The system of claim 5, further comprising:
   a provisioning service component configured to:
   execute remediation operations on the hardware composite in the degraded state based on health state information and a configuration file corresponding to the hardware composite, the health state information and the configuration file retrieved from the datacenter component, wherein remediation operations include validating the health state information of the hardware composite.

7. The system of claim 1, wherein the provisioning service component is configured to:
   decommission the hardware composite when the minimum operational bar is not met for a first tenant having a first SLA that is a factor in the minimum operational bar;
   identify a second tenant having a second SLA, wherein the minimum operational bar is met for the second tenant having the second SLA; and
   executing remediation operations on the hardware composite for the second tenant.

8. The system of claim 7, further comprising:
   a Return Merchandise Authorization component configured to:
   perform opportunistic RMA operations based at least in part on property fields of hardware components in hardware composites, wherein a property field indicates health state information for a corresponding hardware component of a hardware composite.

9. A computer-implemented method for implementing an infrastructure management system, the method comprising:
   determining that a failure of a hardware component has occurred, the hardware component is comprised in a hardware composite;
   accessing a remediation attribute of the hardware composite, wherein the remediation attribute indicates a minimum operational bar for the hardware composite;

determining that the hardware composite operating without the hardware component that has failed meets a minimum operational bar for the hardware composite based on accessing the remediation attribute; and initiating operation of the hardware composite in a degraded state, wherein the degraded state includes the hardware composite operating without the hardware component.

10. The method of claim 9, wherein the minimum operational bar is defined based on health metrics or optional and required components associated with a stock-keeping unit (SKU) of the hardware composite and a Service Level Agreement (SLA) associated with the hardware composite.

11. The method of claim 9, wherein the hardware composite is pre-configured with degraded state configurations in anticipation of the degraded state for operating the hardware composite, wherein the degraded state configuration comprises instructions for operating the hardware in the degraded state.

12. The method of claim 9, wherein upon determining that a failure of the hardware component has occurred, executing remediation operations for the hardware composite to operate in the degraded state are initiated based on health state information and the configuration file corresponding to the hardware composite, wherein remediation operations include validating the health state information of the hardware composite.

13. The method of claim 9, wherein initiating operation of the hardware composite in the degraded state further comprises:

determining that a plurality of hardware components of the hardware composite have failed;

determining, based on the minimum operational bar for the hardware composite, a subset of hardware components of the plurality of hardware components to repair;

repairing the subset of hardware components; and executing remediation operations on the hardware composite.

14. The method of claim 9, further comprising:

decommissioning the hardware composite when the minimum operational bar is not met for a first tenant having a first SLA that is a factor in the minimum operational bar;

identifying a second tenant having a second SLA, wherein the minimum operational bar is met for the second tenant having the second SLA; and executing remediation operation on the hardware composite for the second tenant.

15. The method of claim 9, further comprising:

receiving an indication to initiate Return Merchandise Authorization (RMA) operations to repair the hardware composite, wherein receiving the indication is based in part on SLA requirements for a tenant associated with the hardware composite.

16. A computer storage device having computer-executable instructions embodied thereon that, when executed, by one or more processors, causes the one or more processors to perform a method for implementing an infrastructure management system for hardware failure remediation, the method comprising:

configuring a hardware infrastructure with degraded state configurations in anticipation of a degraded state for operating the hardware infrastructure, wherein the degraded state configurations comprise instructions for operating the hardware infrastructure in the degraded state;

determining that a failure of a hardware component has occurred, the hardware component is comprised in a hardware composite of the hardware infrastructure;

accessing a remediation attribute of the hardware composite, wherein the remediation attributes indicates a minimum operational bar for the hardware composite;

determining that the hardware composite operating without the hardware component that has failed meets the minimum operational bar for the hardware composite;

initiating operation of the hardware composite in the degraded state, wherein the degraded state includes the hardware composite operating without the hardware component; and executing operations using the hardware composite in the hardware infrastructure, wherein executing the operations is based at least in part on the degraded state configurations.

17. The device of claim 16, wherein the hardware infrastructure is pre-configured with degraded state configurations in anticipation of the degraded state for operating the hardware composite, wherein the degraded state configuration comprises instructions for operating the hardware in the degraded state.

18. The device of claim 16, wherein a configuration file based on a configuration schema comprises the degraded state configurations that are accessed during remediation operations to configure the hardware composite to operate in the degraded state.

19. The device of claim 16, wherein degraded state configuration comprises a property field for corresponding hardware components of hardware composites, a property field indicates health state information for a corresponding hardware component of a hardware composite, wherein opportunistic RMA operations are performed based at least in part on property fields of hardware components in hardware composites.

20. The device of claim 16, wherein the minimum operational bar is defined based on a combination of health metrics, optional and required components and a Service Level Agreement associated with the hardware composite.

* * * * *